United States Patent
Yasukawa et al.

(10) Patent No.: US 6,425,088 B1
(45) Date of Patent: Jul. 23, 2002

(54) METHOD OF THE APPARATUS FOR TRANSFERRING DATA BETWEEN CIRCUITS

(75) Inventors: Hideki Yasukawa; Harutaka Goto, both of Kanagawa-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/199,282

(22) Filed: Nov. 25, 1998

(30) Foreign Application Priority Data

Nov. 27, 1997 (JP) ............................................. 9-326407

(51) Int. Cl.⁷ ................................................ G06F 1/04
(52) U.S. Cl. ........................................ 713/400; 713/600
(58) Field of Search ................................... 713/1, 2

(56) References Cited

U.S. PATENT DOCUMENTS 5,448,715 A * 9/1995 Lelm et al. .................. 395/550
5,471,587 A * 11/1995 Fernando .................... 395/309
5,535,377 A * 7/1996 Parks .......................... 395/550
5,600,824 A * 2/1997 Williams et al. ............. 395/551
5,987,081 A * 11/1999 Csoppenszky et al. ...... 375/354

* cited by examiner

Primary Examiner—Bipin Shalwala
Assistant Examiner—Nitin Patel
(74) Attorney, Agent, or Firm—Foley & Lardner (57) ABSTRACT

This invention provides a data transfer method and a data transfer apparatus employing simple hardware to transfer data between two circuits operating at different clock frequencies with reduced data transfer overhead so as to shorten transfer delay time.

The data transfer method and apparatus generate a data transfer reference signal involving a pulse that is within a cycle of a lower one of the clock frequencies and is synchronized with a pulse of a higher one of the clock frequencies. When transferring data between the two circuits, one of the circuits serving as a source circuit uses the data transfer reference signal to determine whether or not the other circuit serving as a destination circuit has completely received data transferred from the source circuit. The method and apparatus are capable of speedily transferring data and quickly recognizing the completion of data transfer.

33 Claims, 7 Drawing Sheets

METHOD OF THE APPARATUS FOR TRANSFERRING DATA BETWEEN CIRCUITS

BACKGROUND OF THE INVENTION

1. Field of the Invention

The present invention relates to a method of and an apparatus for transferring data between circuits. In particular, the present invention relates to a technique of reducing a transfer delay time so as to transfer data asynchronously at high speed between circuits that operate at different clock frequencies in an LSI chip or in different chips.

2. Related Art

Figure 1:
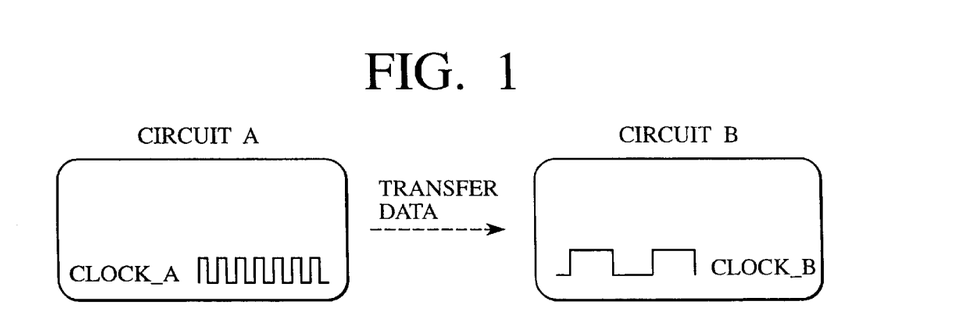
FIG. 1 explains data transfer between two circuits operating at different clock frequencies.

FIG. 1 shows data transfer between two circuits A and B that operate independently of each other on clock signals Clock_A and Clock_B, respectively. These clock signals oscillate at different frequencies, for example in 20 FIG. 1, the clock signal Clock_A at a higher frequency and the clock signal Clock_B at a lower frequency. The data transfer is usually achieved by a handshake technique or an asynchronous RAM technique. These techniques will be explained.

(1) Handshake Technique

Figure 2:
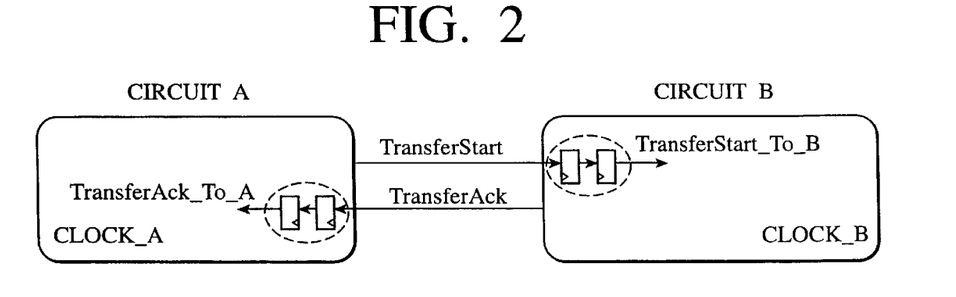
FIG. 2 shows a conventional handshake data transfer in related art.
Figure 3:
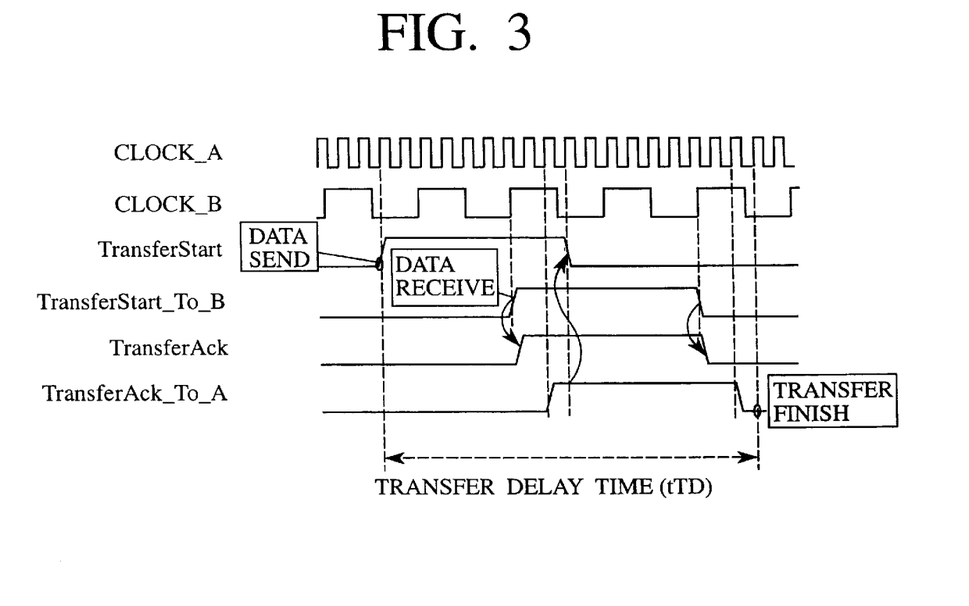
FIG. 3 is a timing chart showing the handshake data transfer.

FIG. 2 roughly shows handshake data transfer between the circuits A and B, and FIG. 3 is a timing chart showing the handshake data transfer. In FIG. 2, each part encircled with a dotted line includes two flip-flops to settle a metastable state, which is a transient oscillating state caused when receiving a signal. The two flip-flops delay data transfer timing by two pulses, and therefore, the circuits A and B start each the next operation in response to the second pulse after the reception of a signal.

A handshake data transfer operation from the circuit A to the circuit B will be explained. The circuit A sends a signal TransferStart to inform the circuit B of the start of data transfer. The signal TransferStart is delayed by two pulses and forms a signal TransferStart_To_B, in response to which the circuit B recognizes the data transfer from the circuit A. The circuit B returns an acknowledge signal TransferAck to the circuit A. The signal TransferAck is delayed by two pulses and forms a signal TransferAck_To_A, in response to which the circuit A recognizes that the circuit B has received the data. The circuit A negates the signal TransferStart to inform the circuit B of the completion of the data transfer. The negation of the signal TransferStart is delayed by two pulses and negates the signal TransferStart_To_B. In response to this, the circuit B recognizes that the signal TransferStart has been negated and negates the signal TransferAck. The negation of the signal TransferAck is delayed by two pulses and negates the signal TransferAck_To_A. In response to this, the circuit A recognizes that the signal TransferAck has been negated. This completes the handshake data transfer operation.

(2) Asynchronous RAM Technique

Figure 4:
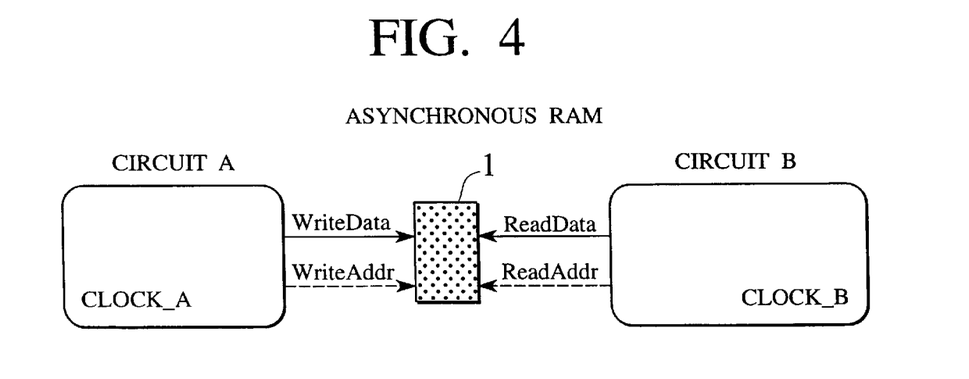
FIG. 4 shows a conventional asynchronous RAM data transfer.

FIG. 4 roughly shows asynchronous RAM data transfer between the circuits A and B. This technique arranges an asynchronous RAM 1 between the circuits A and B. The RAM 1 has a data write port, a data read port, an address write port, and an address read port. The circuits A and B independently carry out write and read operations according to the respective clock signals Clock_A and Clock_B of different frequencies. The RAM 1 absorbs the frequency difference between these clock signals.

The related arts (1) and (2) mentioned above have some problems. The handshake technique (1) makes the both circuits A and B acknowledge every reception of a control signal such as TransferStart or TransferAck when transferring data between the circuits A and B. Accordingly, the handshake technique needs a long time to transfer each piece of data. As shown in FIG. 3, a transfer delay time tTD involved in transferring a piece of data from the circuit A to the circuit B by the handshake technique is very long. Namely, the handshake technique needs a large overhead time that is irrelevant to data transfer itself and is wasted for handling a variety of control operations. The handshake technique processes each transfer request sequentially, and transferring "n" pieces of data by the handshake technique will expand the delay time tTD by "n" times. In this way, the handshake technique involves a long transfer delay time, and therefore, is not appropriate for transferring a large amount of data.

On the other hand, the asynchronous RAM technique (2) must arrange an asynchronous RAM for each transfer direction. More precisely, the one-way data transfer of FIG. 4 needs an asynchronous RAM having two data ports and two address ports. But to carry out two-way data transfer, two asynchronous RAMs each having two data ports and two address ports are needed. In this way, the asynchronous RAM technique involves a large increase in the quantity of hardware.

SUMMARY OF THE INVENTION

This invention is intended to overcome the above mentioned problems. An object of the present invention is to provide a method of and an apparatus for achieving two-way asynchronous data transfer between circuits operating at different clock frequencies, capable of reducing data transfer overhead, so as to shorten a transfer delay time, and transferring data at high speed without greatly increasing the quantity of hardware.

Figure 5:
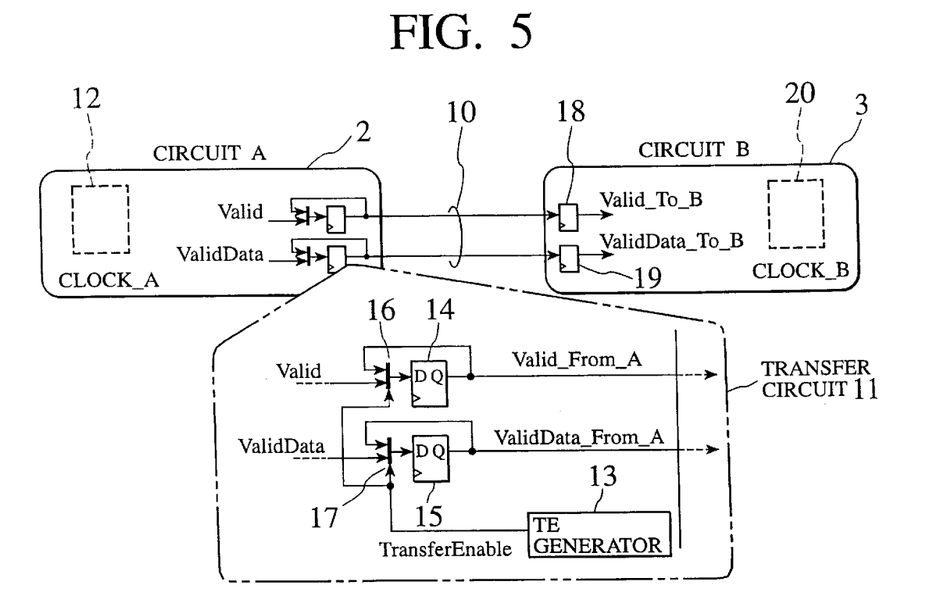
FIG. 5 shows an apparatus for transferring data in a forward direction according to a first embodiment of the present invention.

In order to accomplish the objects, the present invention generates a reference signal from two clock signals of different clock frequencies that drive two circuits between which data is transferred. One of the circuits serving as a source circuit uses the reference signal to instantaneously recognize the completion of data transfer inside the source circuit. FIG. 5 shows an example of a apparatus and method for realizing the present invention.

The present invention provides an apparatus of FIG. 5 for transferring data between a source circuit 2 and a destination circuit 3. The circuits 2 and 3 operate independently of each other at different clock frequencies. Namely, the circuit 2 operates on a first clock signal having a first frequency, and the circuit 3 operates on a second clock signal having a second frequency that is lower than the first frequency. The apparatus has a reference signal generator 13 for generating a data transfer reference signal, which involves a pulse that is within a cycle of the second clock signal and is synchronized with a pulse of the first clock signal.

The source circuit 2 uses the reference signal to determine whether or not the destination circuit 3 has completely received data transferred from the source circuit 2.

Each reference signal always involves a pulse that is within a period of the second clock signal, so that the destination circuit 3 operating on the second clock signal surely receives data from the source circuit 2. The reference signal allows the source circuit 2 to recognize the completion of data transfer from the source circuit 2 to the destination circuit 3 without an acknowledge signal from the destination circuit 3. This reduces data transfer overhead and shortens a transfer delay time.

Figure 6:
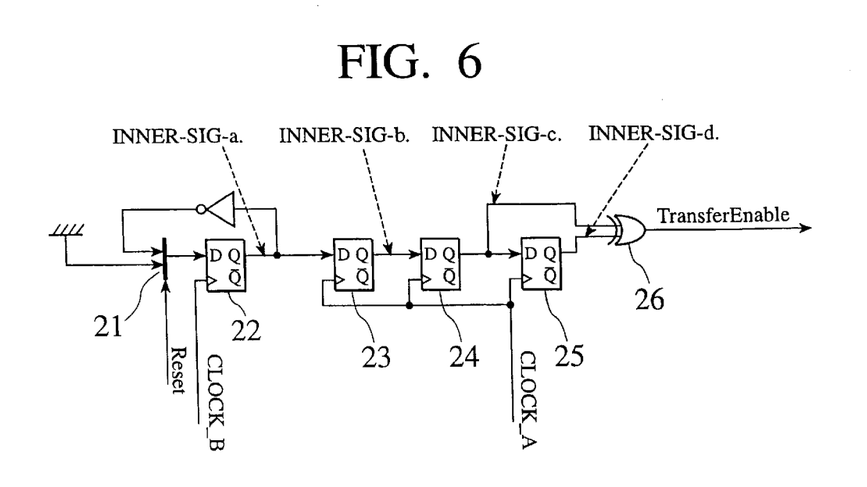
FIG. 6 shows a transfer enable signal generator according to the first embodiment.

The data transfer reference signal may be generated by a circuit of FIG. 6. This circuit comprises a first flip-flop circuit 22 that receives a signal whose frequency is half the second frequency and operates on the second clock signal, second flip-flop circuits 23, 24, and 25 that are connected to the first flip-flop circuit 22 in series and operate on the first clock signal, and an EXOR (Exclusive OR) circuit 26 for providing an EXOR of two output signals having different phases from the first and second flip-flop circuits.

Figure 8:
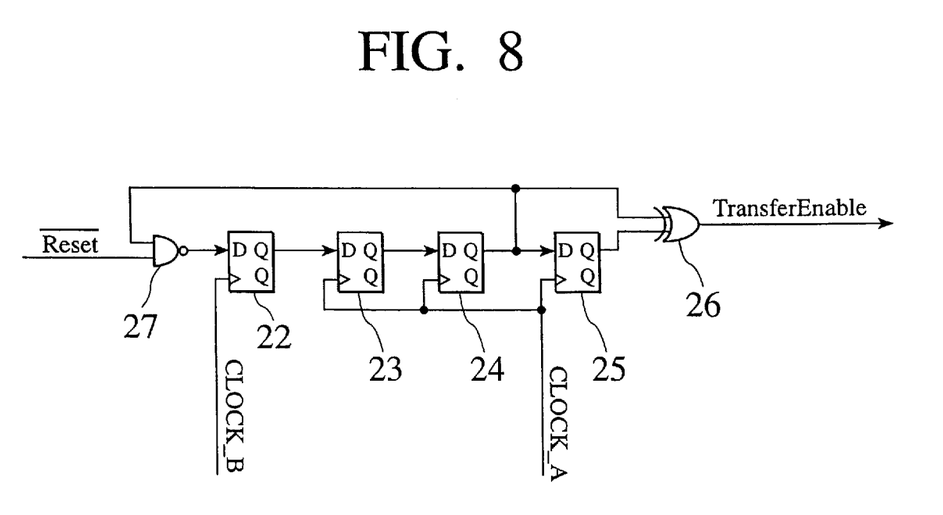
FIG. 8 shows a transfer enable signal generator according to a modification of the first embodiment.

Alternatively, the data transfer reference signal may be generated by a circuit of FIG. 8. This circuit comprises a first flip-flop circuit 22 that receives a loop-backed signal of a NAND of a signal generated by the reference signal generator and operates on the second clock signal, second flip-flop circuits 23, 24, and 25 that are connected to the first flip-flop circuit 22 in series and operate on the first clock signal, and an EXOR circuit 26 that provides an EXOR of two output signals having different phases from the first and second flip-flop circuits.

Figure 13:
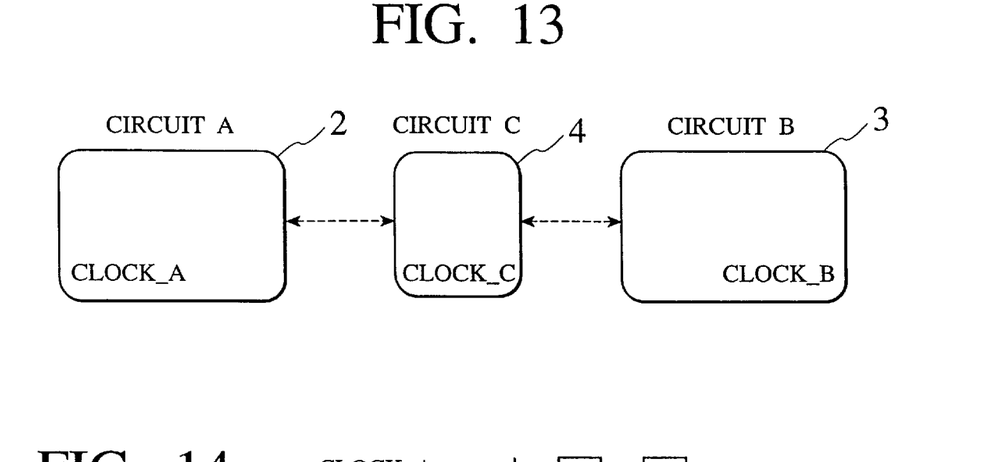
FIG. 13 shows an apparatus for transferring data between circuits A and B operating at close clock frequencies according to a second embodiment of the present invention.

If the operating clock frequencies of the two circuits are close to each other, the present invention inserts a third circuit 4 of FIG. 13 between the two circuits 2 and 3. The third circuit 4 operates on a clock signal whose frequency is higher than those of the first and second clock signals. The third circuit 4 relays data between the circuits 2 and 3 so that the third circuit 4 realize the data transfer mentioned above.

In other words, the configuration involving the third circuit 4 is capable to generate the data transfer reference signal and shorten the transfer delay time even if the operating clock frequencies of the source and destination circuits are close to each other.

Figure 12:
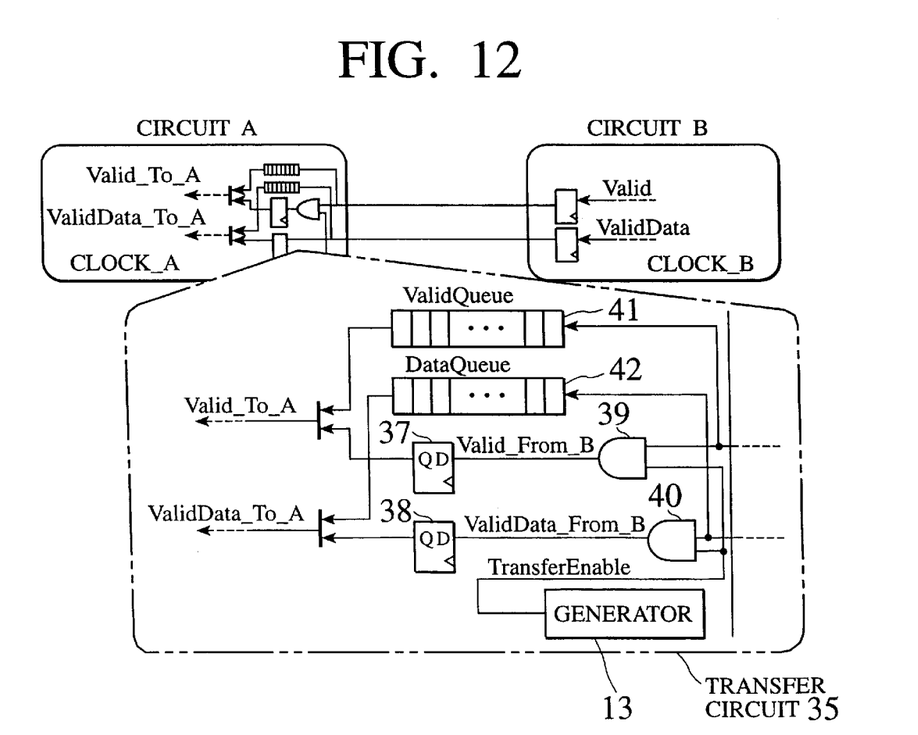
FIG. 12 shows a modification of the first embodiment with a read queue arranged in the circuit A.

To carry out reverse data transfer from the circuit 3 operating at the lower frequency toward the circuit 2 operating at the higher frequency with a transfer request from the circuit 3, the present invention may arrange read buffer circuits (41, 42) of FIG. 12 for the circuit 2. The read buffer circuits (41, 42) hold data transferred from the circuit 3. The read buffer circuits eliminate the need of transmitting a transfer request for each piece of data. This shortens a transfer delay time when continuously transferring data.

Other and further objects and feature s of the present invention will become obvious upon an understanding of the illustrative embodiments about to be described in connection with the accompanying drawings or will be indicated in the appended claims, and various advantages not referred to herein will occur to one skilled in the art upon employing of the invention in practice.

DETAILED DESCRIPTION OF THE EMBODIMENTS

1. First Embodiment

A method of and an apparatus for transferring data according to the first embodiment of the present invention will be explained in detail with reference to the accompanying drawings.

(1) Forward Data Transfer

Forward data transfer is data transfer from a circuit operating at a higher clock frequency toward a circuit operating at a lower clock frequency. FIG. 5 shows a data transfer apparatus according to the first embodiment. Circuits A (2) and B (3) are connected to each other through a line 10 and operate independently of each other at different clock frequencies. More precisely, the circuit A, serving as the first circuit in claims, operates on a clock signal Clock_A having a higher clock frequency and the circuit B, serving as the second circuit in claims, operates on a clock signal Clock_B having a lower clock frequency.

The circuit A has a transfer circuit 11 and an internal circuit 12 that issues a data transfer request to the transfer circuit 11. The transfer circuit 11 has a transfer enable signal generator (hereinafter referred to as the TE generator) 13, flip-flops 14 and 15, and multiplexers 16 and 17.

The internal circuit 12 provides data transfer request signals Valid and ValidData to the multiplexers 16 and 17 in the transfer circuit 11, respectively, in synchronization with the clock signal Clock_A. The signal Valid informs the circuit B serving as a destination circuit that transferred data is valid. The signal ValidData indicates data transfer and is attached to data to be transferred. In the following explanation, transmitting and receiving data are synonymous with transmitting and receiving the signal ValidData. Upon receiving a data transfer enable signal (hereinafter referred to as the signal TE) serving as a reference signal from the TE generator 13, the multiplexers 16 and 17 send the signals Valid and ValidData to the flip-flops 14 and 15. In this way, signals Valid and ValidData are sampled by the flip-flops 14 and 15 in response to the signal TE. The signals Valid and ValidData synchronized with the clock signal Clock_A are converted by the flip-flops 14 and 15 into pulse signals Valid_From_A and ValidData_From_A, which are transferred to and sampled by the circuit B based on the clock signal Clock_B.

The circuit B has flip-flops 18 and 19 for receiving data and an internal circuit 20 serving as a destination of the data. Upon receiving the signals Valid_From_A and ValidData_

From_A from the circuit A, the flip-flops 18 and 19 operating on the clock signal Clock_B convert them into signals Valid_To_B and ValidData_To_B, which are synchronized with the click signal Clock_B and are sent to the internal circuit 20. The signal Valid_From_A arriving at the circuit B must satisfy a setup time of the circuit B.

The details of the TE generator 13 will be explained.

(a) First Example of TE Generator

FIG. 6 shows a first ex ample of the TE generator 13 for generating TE (TransferEnable) signal serving as the data transfer reference signal. The TE generator 13 has a multiplexer 21 that selects high-level data in response to a reset signal Reset, a flip-flop 22 that receives a signal whose frequency is half the frequency of the clock signal Clock_B and operates on the clock signal Clock_B, three flip-flops 23, 24, and 25 operating on the clock signal Clock_A, and an EXOR circuit 26 for providing an EXOR of two output signals having different phases from the flip-flops 24 and 25. The flip-flops 23 and 24 work to settle a meta-stable state.

Figure 7:
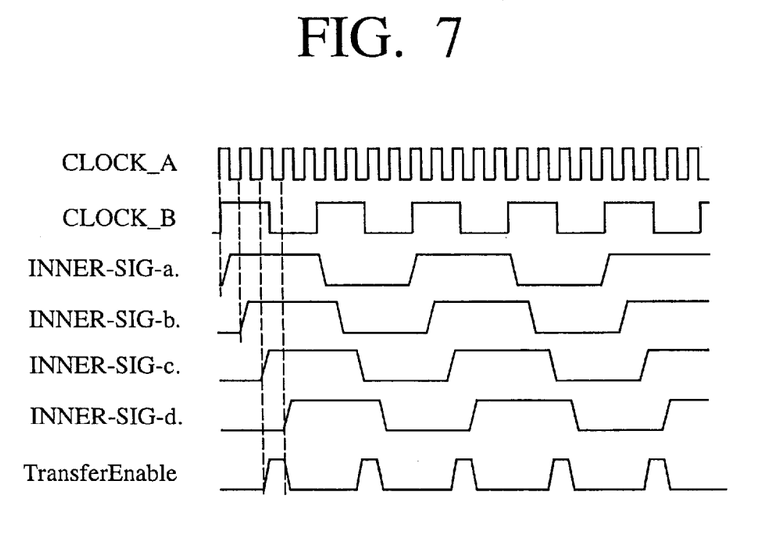
FIG. 7 is a timing chart showing the operation of the transfer enable signal generator.

FIG. 7 is a timing chart showing the operation of the TE generator 13 of FIG. 6. The flip-flops 22 to 25 are connected in series to provide output signals Inner-sig-a, Inner-sig-b, Inner-sig-c, and Inner-sig-d, respectively. The flip-flop 22 provides the signal Inner-sig-a corresponding to a cycle of the clock signal Clock_B. The phase of the signal Inner-sig-a is shifted by one pulse whenever it passes through one of the flip-flops 23 to 25, and the phase shifted signal is supplied to the EXOR circuit 26. The EXOR circuit 26 receives the signal Inner-sig-c from the third flip-flop 24 and the signal Inner-sig-d from the fourth flip-flop 25 and provides an EXOR thereof as the transfer enable signal TE. The signal TE involves a pulse that is within a cycle of the lower-frequency clock signal Clock_B and is synchronized with a pulse of the higher-frequency clock signal Clock_A. Based on the signal TE, the internal circuit 12 of FIG. 5 determines whether or not the signals Valid and ValidData serving as data transfer request have been accepted by the transfer circuit 11.

As is apparent in FIG. 7, the clock frequencies of the circuits A and B must have a ratio of 3 or above to properly generate the signal TE. This ratio may vary depending on a transfer distance between the two circuits, a setup time and a hold time of the TE generator 13, etc. If the ratio is too small, the data transfer reference signal (namely signal TE) itself cannot be generated. In the first embodiment, the frequency ratio of the circuits A and B is 4.5 as an example.

(b) Second Example of TE Generator

FIG. 8 shows a second example of the TE generator 13. The same parts as those of FIG. 6 are represented with same reference marks. The TE generator 13 of FIG. 8 differs from that of FIG. 6 in that a signal provided by a third flip-flop 24 is supplied to a NAND circuit 27 so that a NAND of the output of the flip-flop 24 and a reset signal Reset is looped back to a flip-flop 22. Similar to the TE generator 13 of FIG. 6, the TE generator 13 of FIG. 8 generates a transfer enable signal TE involving a pulse that is within a cycle of the lower-frequency clock signal Clock_B and is synchronized with a pulse of the higher-frequency clock signal Clock_A.

The TE generator 13 of FIG. 8 is simpler in circuit scale than that of FIG. 6.

Figure 9:
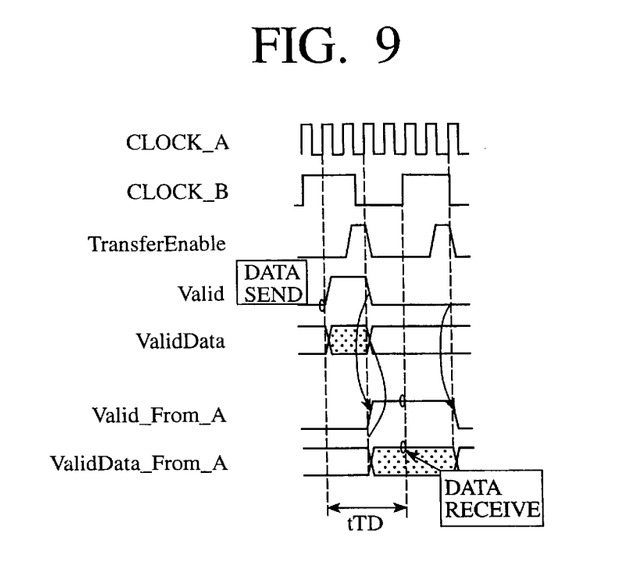
FIG. 9 is a timing chart showing a data transfer operation from a circuit A to a circuit B.

A data transfer operation from the circuit A to the circuit B of FIG. 5 will be explained with reference to the timing chart of FIG. 9.

The internal circuit 12 of the circuit A generates the signals Valid and ValidData in synchronization with the clock signal Clock-A. When the transfer enable signal TE rises, the transfer circuit 11 fetches the signals Valid and ValidData. The internal circuit 12 monitors the level of the signal TE, and when the signal TE rises, recognizes that the transfer circuit 11 has accepted the data transfer request. A pulse later, the internal circuit 12 negates the signals Valid and ValidData. After fetching the signals Valid and ValidData in response to the rise of the signal TE, the transfer circuit 11 provides the signals Valid_From_A and ValidData_From_A. When the signal TE rises in next time, the transfer circuits 11 negates the signals Valid_From_A and ValidData_From_A. This is because a pulse edge of the clock signal Clock_B always rises at the timing "DataReceive" of FIG. 9 before the second rise of the signal TE, so that the data is surely fetched by the circuit B at the timing "DataReceive."

The signals Valid_From_A and ValidData_From_A transferred to the circuit B are converted by the flip-flops 18 and 19 into the signals Valid_To_B and ValidData_To_B that are synchronized with the clock signal Clock_B.

In this way, the internal circuit 12 of the circuit A uses the signal TE generated inside the circuit A to determine whether or not data transferred from the circuit A to the circuit B has been received by the circuit B. Compared with the conventional handshake technique, the first embodiment greatly reduces data transfer overhead, so as to shorten the transfer delay time tTD. In this way, the first embodiment is capable of shortening the delay time tTD into a cycle of the clock signal Clock_B. For example, the transfer delay time tTD of the first embodiment is about one fourth of that of the handshake technique of FIG. 3. The first embodiment is applicable to synchronously continuous transferring a large amount of data and is capable of transferring "n" pieces of data within "n" or "n+1" cycles of the clock signal Clock_B.

The circuit A of FIG. 5 has the TE generator, flip-flops, and multiplexers in addition to the conventional circuit. This addition by the first embodiment is incomparably smaller than addition made by the conventional asynchronous RAM technique.

(2) Reverse Data Transfer

Figure 10:
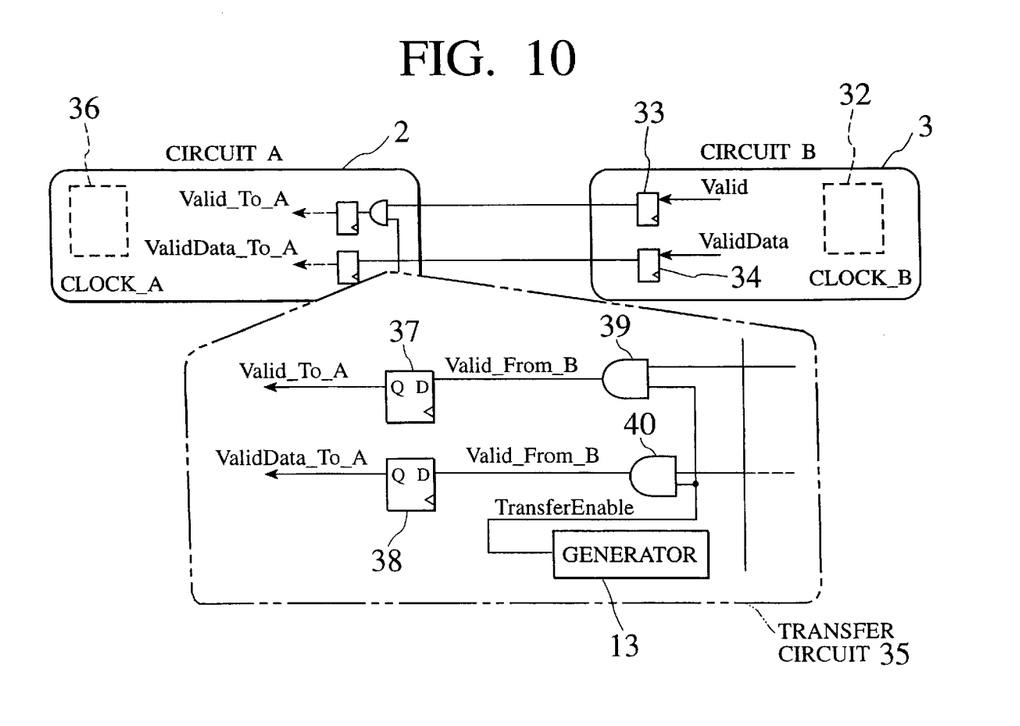
FIG. 10 shows an apparatus for transferring data in a reverse direction according to the first embodiment.

Reverse data transfer is data transfer from a circuit operating at a lower clock frequency toward a circuit operating at a higher clock frequency. FIG. 10 shows an apparatus for carrying out a reverse data transfer according to the first embodiment of the present invention. A circuit A operates on a clock signal Clock_A having a higher frequency and a circuit B on a clock signal Clock_B having a lower frequency as explained in forward data transfer (1).

The circuit B has an internal circuit 32 that issues a data transfer request and flip-flops 33 and 34 operating on the clock signal Clock_B. The internal circuit 32 issues data transfer request signals Valid and ValidData, and the flip-flops 33 and 34 convent them into signals Valid_From_B and ValidData_From_B, which are transferred to the circuit A.

The circuit A has a transfer circuit 35 for receiving the transferred data and an internal circuit 36 for receiving the data from the transfer circuit 35. The transfer circuit 35 has a TE generator 13 for generating a signal transfer enable signal TE, flip-flops 37 and 38, and an AND circuits 39 and 40. These elements operate on the clock signal Clock_A. The TE generator 13 is same as one of those of FIGS. 6 and 8.

The circuit A samples the signals Valid_From_B and ValidData_From_B transmitted from flip-flops 33 and 34 in the circuit B according to the timing of the signal TE. The AND circuit 39 provides an AND of the signals TE and Valid-From-B. The AND circuit 40 provides an AND of the signals TE and ValidData_From_B. The flip-flops 37 and 38 fetch the signals Valid_From_B and ValidData_From_B and convert them into signals Valid_To_A and ValidData_To_A, which are sent to the internal circuit 36.

Figure 11:
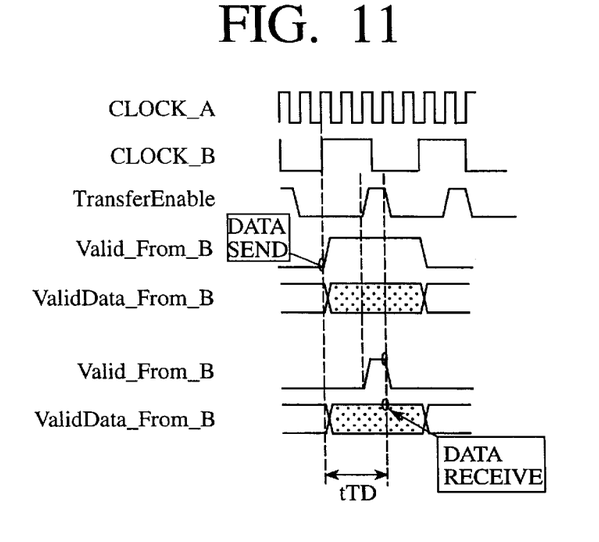
FIG. 11 is a timing chart showing the reverse data transfer from the circuit B to the circuit A.

The data transfer from the circuit B to the circuit A will be explained with reference to the timing chart of FIG. 11.

The circuit B transmits the signals Valid_From_B and ValidData_From_B to the circuit A in synchronization with the clock signal Clock_B. The signals are fetched by the transfer circuit 35 of the circuit A. The AND circuit 39 provides an AND of signal TE generated in TE generator 13 and the signal Valid_From_B. The signal ValidData_From_B is fetched at the same timing as the signal Valid_From_B. Accordingly, it can be omitted arranging an AND circuit 40 for the signal ValidData_From_B, although such an AND circuit 40 may be arranged if necessary.

After transmitting the signals Valid_From_B and ValidData_From_B, the circuit B negates the signals Valid and ValidData in response to the next pulse rise of the clock signal Clock_B. The level of the signal TE always rises to High once within a cycle of the clock signal Clock_B as indicated with "DataReceive" in FIG. 11, so that the signals Valid_From_B and ValidData_From_B are surely fetched by the circuit A and so that the circuit B recognizes the completion of data transfer at the timing "DataReceive."

The signals Valid_From_B and ValidData_From_B transferred to the circuit A are converted by the flip-flops 37 and 38 into signals Valid_To_A and ValidData_To_A that are synchronized with the clock signal Clock_A.

In this way, when transferring data from the circuit B to the circuit A, the circuit A provides an AND of the signal TE and one of the transferred signals Valid_From_B and ValidData_From_B, to easily detect the data. A transfer delay time tTD of FIG. 11 is short like that of FIG. 9.

A modification of the first embodiment will be explained.

This modification employs a read buffer. Assume that data transfer request from circuit B towards circuit A arises in the destination circuit (circuit A) in the reverse data transfer shown in FIG. 10.

In this case, the circuit A of FIG. 10 issues a request to the circuit B for transferring data, and in response to the request, the circuit B transfers data to the circuit A. If the circuit A frequently issues such a request, the transfer operation mentioned above must be repeated many times to elongate a transfer time.

To shorten the transfer time, the modification of FIG. 12 inserts read queues including a valid queue (ValidQueue) 41 and a data queue (DataQueue) 42 into the circuit A. Before the circuit A sends transfer requests to the circuit B, the circuit B transmits data which the circuit B determines to be sendable to the circuit A beforehand. In FIG. 12, the same parts as those of FIG. 10 are represented with same reference marks. Note that the AND circuit 40 can be omitted same as that in transfer circuit 35 in FIG. 10. While the read queues hold data, the circuit A can fetch the data in each cycle of the clock signal Clock_A, to greatly reduce data transfer overhead. The operation of transferring data from the circuit B to the circuit A is the same as that explained above with reference to the timing chart of FIG. 11.

This modification reduces the quantity of hardware less than that of the asynchronous RAM technique of FIG. 4. The depth of each queue of the modification is determined in a designing stage on the basis of specifications of circuits to which this invention applied.

The modification eliminates the overhead of a data receiving circuit of issuing a data transfer request for each piece of data, and therefore, is effective when continuously transferring data.

2. Second Embodiment

A method of and an apparatus for transferring data according to the second embodiment of the present invention will be explained. In particular, the difference between the first and second embodiments will be explained in detail with reference to the accompanying drawings.

The second embodiment is effective when transferring data between two circuits that operate at close clock frequencies.

In the first embodiment, the clock frequencies of the circuits A and B employ a ratio of 4.5. If the frequencies of the two circuits are close to each other, it is not capable to generate the signal TE itself. This is because the Clock_A must be provided to three flip-flops 23, 24 and 25 while the Clock_B is once provided to one flip-flop 22, as shown in FIGS. 6 and 8. Accordingly, the frequency of Clock_A must be at least three times as high as that of Clock_B. In this case, the first embodiment is inapplicable as it is. The second embodiment inserts a third circuit, which operates at a higher clock frequency than the circuits A and B, between the circuits A and B, so as to realize the data transfer method and apparatus according to this invention.

FIG. 13 shows a data transfer apparatus according to the second embodiment. Data is transferred between circuits A and B that operate at close clock frequencies. A circuit C is inserted between the circuits A and B, the circuit C operates at a clock frequency that is higher than the operating frequencies of the circuits A and B. For example, if the circuit A operates on a clock signal Clock_A of 100 MHz, the circuit B on a clock signal Clock_B of 80 MHz, then the circuit C on a clock signal Clock_C of 500 MHz that is more than three times as high as the clock signal Clock_A. These value of clock frequencies are only examples and do not limit the present invention.

It is preferable that the ratio of the clock frequency of the circuit C to that of the circuit A is at least 3.3.

Relationships among the circuits A, B, and C of FIG. 13 will be explained with reference to FIGS. 5 and 10. The circuit A of FIG. 5 corresponds to the circuit C of FIG. 13, and the circuit B of FIG. 5 to the circuit A of FIG. 13. The circuit A of FIG. 10 corresponds to the circuit C of FIG. 13, and the circuit B of FIG. 10 to the circuit B of FIG. 13.

The circuit C of FIG. 13 operates at a higher clock frequency than the circuits A and B. Accordingly, the circuit C has both the transfer circuit 11 of FIG. 5 and the transfer circuit 35 of FIG. 10. The circuit C transmits and receives data to and from each of the circuits A and B, and therefore, the circuit C has two sets of the transfer circuits 11 and 35. Since the circuits A and B operate at different clock frequencies, the circuit C generates two transfer enable signals TE_AC and TE_BC for the two sets, respectively. In other words, the clock frequencies of TE_TC and TE_BC differed from each other.

TE generators for generating these transfer enable signals are each any one of the TE generators shown in FIGS. 6 and 8. Each transfer circuit incorporated in the circuits A and C is the same as that explained above, and therefore, is not explained again.

To transfer data from the circuit A to the circuit B in FIG. 13, the data is first transferred from the circuit A to the circuit C, and then, from the circuit C to the circuit B. The data transfer operation from the circuit A to the circuit C and the data transfer operation from the circuit C to the circuit B are the same as the forward and reverse data transfer operations explained above, and therefore, are not explained again.

Figure 14:
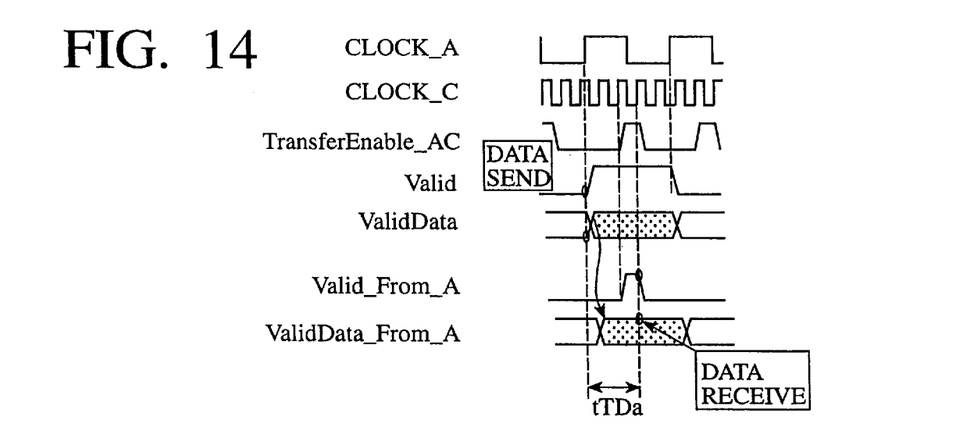
FIG. 14 is a timing chart showing data transfer from the circuit A to a circuit C according to the second embodiment.

FIG. 14 is a timing chart showing the data transfer operation from the circuit A to the circuit C. The circuit A transmits signals Valid_From_A and ValidData_From_A, which are fetched by the circuit C according to the signal TE_AC. This data transfer from the circuit A to the circuit C is the same as the reverse data transfer of FIG. 11. FIG. 14, therefore, is substantially the same as FIG. 11 except the timing of the signal TE_AC.

Figure 15:
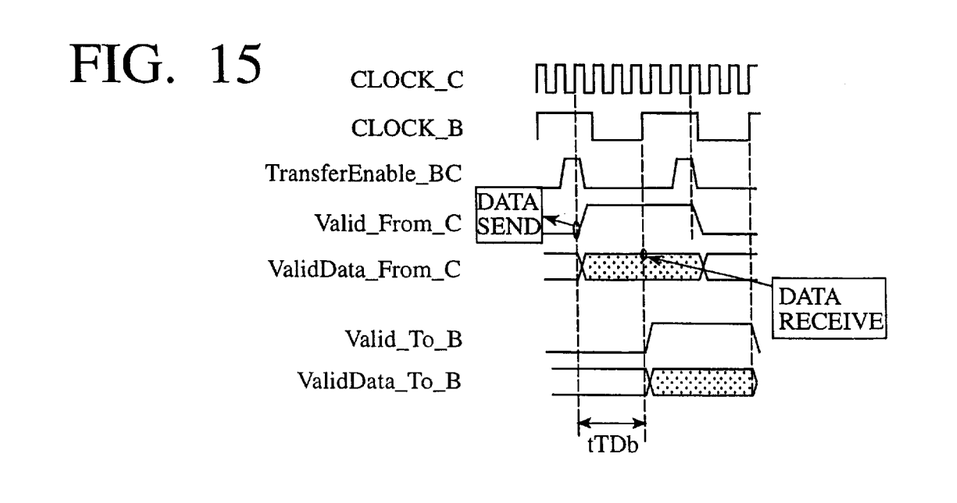
FIG. 15 is a timing chart showing data transfer from the circuit C to the circuit B according to the second embodiment.

FIG. 15 is a timing chart showing the data transfer operation from the circuit C to the circuit B. The circuit C transmits signals Valid_From_C and ValidData_From_C, which are fetched by the circuit B in response to the next rise of the signal TE_BC. The data transfer from the circuit C to the circuit B is the same as the forward data transfer of FIG. 9. FIG. 15, therefore, is substantially the same as FIG. 9 except the timing of the signal TE_BC.

In this way, the second embodiment inserts a circuit operating at a higher clock frequency between two circuits serving as source and destination circuits, to realize the data transfer according to this invention even if the clock frequencies of the source and destination circuits are close to each other. Namely, the second embodiment utilizes the forward and reverse data transfer techniques of the first embodiment, to shorten a transfer delay time tTD (tTDa+ tTDb) involved in transferring each piece of data.

In the configuration shown in FIG. 13, a data transfer capacity from the circuit A to the circuit C differs from that from the circuit C to the circuit B. Namely, a transfer rate from the circuit C to the circuit B is lower than that from the circuit A to the circuit C. If the quantity of data to be transferred is large, data from the circuit A will accumulate in the circuit C and a buffer memory of the circuit C will overflow to hold the data. To solve this problem, the circuit C may send a transfer authorization signal to the circuit A, to control the quantity of data to be transferred from the circuit A to the circuit C.

Although the second embodiment arranges the circuit C between the circuits A and B, the circuit C may be incorporated in the circuit A or B. The present invention is applicable not only to microprocessors but also to a variety of ICs.

In a summary, the data transfer method and apparatus of the present invention use a data transfer enable signal (signal TE) as a reference signal to determine whether or not transferred data has been received by a destination circuit. Compared with the conventional handshake technique that transfers data in accordance to the clock frequency of the destination circuit, the present invention reduces an overhead time needed for transferring each piece of data and shortens a transfer delay time. Compared with the conventional asynchronous RAM technique, the present invention greatly reduces the quantity of hardware. Consequently, the data transfer method and apparatus of the present invention are capable of transferring data at high speed between circuits that operate at different clock frequencies.

Various modifications will become possible for those skilled in the art after receiving the teachings of the present disclosure without departing from the scope thereof.

What is claimed is:

1. An apparatus for transferring data between a source circuit and a destination circuit that operate independently of each other, the source circuit operating on one of a first clock signal having a first frequency and a second clock signal having a second frequency that is lower than the first frequency, the destination circuit operating on the other of the first and second clock signals, the apparatus comprising:
   a reference signal generator for generating a data transfer reference signal having one pulse within a cycle of the second clock signal and synchronized with a rising edge of one of the pulses of the first clock signal; and
   a transfer circuit that transfers data using the data transfer reference signal.

2. The apparatus of claim 1, wherein said transfer circuit determines whether or not the destination circuit has completely received data transferred from the source circuit.

3. An apparatus for transferring data between first and second circuits that operate independently of each other with the first circuit operating on a first clock signal of a first frequency and the second circuit operating on a second clock signal of a second frequency that is lower than the first frequency, comprising:
   a reference signal generator for generating a data transfer reference signal having one pulse within a cycle of the second clock signal and synchronized with a rising edge of one of the pulses of the first clock signal; and
   a transfer circuit that transfers data using the data transfer reference signal.

4. The apparatus of claim 3, further comprising:
   a third circuit arranged between and connected to the first and second circuits for transferring data therebetween and operating on a third clock signal having a third frequency that is higher than anyone of the first and second frequencies.

5. The apparatus of claim 3, wherein said transfer circuit determines whether or not the second circuit has completely received data transferred from the first circuit using the data transfer reference signal.

6. An apparatus for transferring data between first and second circuits that operate independently of each other with the first circuit operating on a first clock signal of a first frequency and the second circuit operating on a second clock signal of a second frequency that is lower than the first frequency, comprising:
   a reference signal generator for generating a data transfer reference signal having one pulse within a cycle of the second clock signal and synchronized with a rising edge of one of the pulses of the first clock signal; and
   a transfer circuit that transfers data using the data transfer reference signal.

7. The apparatus of claim 6, further comprising:
   a third circuit arranged between and connected to the first and second circuits for transferring data therebetween and operating on a third clock signal having a third frequency that is higher than anyone of the first and second frequencies.

8. The apparatus of claim 6, wherein said transfer circuit determines whether or not the first circuit has completely received data transferred from the second circuit using the data transfer reference signal.

9. An apparatus for transferring data between a source circuit and a destination circuit that operate independently of each other, the source circuit operating on one of a first clock signal having a first frequency and a second clock signal having a second frequency that is lower than the first frequency, the destination circuit operating on the other of the first and second clock signals, the apparatus comprising:
   a reference signal generator for generating a data transfer reference signal having one pulse within a cycle of the second clock signal and synchronized with one of pulses of the first clock signal; and a transfer circuit that transfers data using the data transfer reference signal to determine whether or not the destination circuit has completely received data transferred from the source circuit, wherein said reference signal generator includes:

a first flip-flop circuit that receives a signal whose frequency is half the second frequency and operates on the second clock signal;

a second flip-flop circuit that is connected to the first flip-flop circuit in series and operates on the first clock signal; and an EXOR circuit that provides an EXOR of two output signals having different phases from the first and second flip-flop circuits.

10. The apparatus of claim 9, further comprising:

two flip-flop circuits that are arranged between and connected to the first and second flip-flop circuits in series and operate on the first clock signal, to pass the output of the first flip-flop circuit to the EXOR circuit.

11. The apparatus of claim 9, further comprising:

a data relay circuit arranged between and connected to the source and destination circuits and operating on a third clock signal of a third frequency that is higher than any one of the first and second frequencies.

12. The apparatus of claim 11, wherein the third frequency is at least three times as high as the first frequency.

13. An apparatus for transferring data between a source circuit and a destination circuit that operate independently of each other, the source circuit operating on one of a first clock signal having a first frequency and a second clock signal having a second frequency that is lower than the first frequency, the destination circuit operating on the other of the first and second clock signals, the apparatus comprising:

a reference signal generator for generating a data transfer reference signal having one pulse within a cycle of the second clock signal and synchronized with one of pulses of the first clock signal; and a transfer circuit that transfers data using the data transfer reference signal to determine whether or not the destination circuit has completely received data transferred from the source circuit, wherein said reference signal generator includes:

a first flip-flop circuit that receives a loop-backed signal of a NAND of a signal generated by the reference signal generator and operates on the second clock signal;

a second flip-flop circuit that is connected to the first flip-flop circuit in series and operates on the first clock signal; and an EXOR circuit that provides an EXOR of two output signals having different phases from the first and second flip-flop circuits.

14. The apparatus of claim 13, further comprising:

two flip-flop circuits that are arranged between and connected to the first and second flip-flop circuits in series and operate on the first clock signal, to pass the output of the first flip-flop circuit to the EXOR circuit.

15. The apparatus of claim 13, further comprising:

a data relay circuit arranged between and connected to the source and destination circuits and operating on a third clock signal of a third frequency that is higher than any one of the first and second frequencies.

16. The apparatus of claim 15, wherein the third frequency is at least three times as high as the first frequency.

17. An apparatus for transferring data between a source circuit and a destination circuit that operate independently of each other, the source circuit operating on one of a first clock signal having a first frequency and a second clock signal having a second frequency that is lower than the first frequency, the destination circuit operating on the other of the first and second clock signals, the apparatus comprising:

a reference signal generator for generating a data transfer reference signal having one pulse within a cycle of the second clock signal and synchronized with one of pulses of the first clock signal; and a transfer circuit that transfers data using the data transfer reference signal to determine whether or not the destination circuit has completely received data transferred from the source circuit, wherein said reference signal generator is arranged in one of the source and destination circuits that operates on the first clock signal.

18. An apparatus for transferring data between a source circuit and a destination circuit that operate independently of each other, the source circuit operating on one of a first clock signal having a first frequency and a second clock signal having a second frequency that is lower than the first frequency, the destination circuit operating on the other of the first and second clock signals, the apparatus comprising:

a reference signal generator for generating a data transfer reference signal having one pulse within a cycle of the second clock signal and synchronized with one of pulses of the first clock signal; and a transfer circuit that transfers data using the data transfer reference signal to determine whether or not the destination circuit has completely received data transferred from the source circuit, wherein one of the source and destination circuits that operates on the first clock signal includes a read buffer circuit for holding data transferred from the source circuit to the destination circuit.

19. An apparatus for transferring data between a source circuit and a destination circuit that operate independently of each other, the source circuit operating on one of a first clock signal having a first frequency and a second clock signal having a second frequency that is lower than the first frequency, the destination circuit operating on the other of the first and second clock signals, the apparatus comprising:

a reference signal generator for generating a data transfer reference signal having one pulse within a cycle of the second clock signal and synchronized with one of pulses of the first clock signal;

a transfer circuit that transfers data using the data transfer reference signal to determine whether or not the destination circuit has completely received data transferred from the source circuit; and a data relay circuit arranged between and connected to the source and destination circuits and operating on a third clock signal of a third frequency that is higher than any one of the first and second frequencies.

20. The apparatus of claim 19, wherein the third frequency is at least three times as high as the first frequency.

21. A method of transferring data between a source circuit and a destination circuit that operate independently of each other, the source circuit operating on one of a first clock signal having a first frequency and a second clock signal having a second frequency that is lower than the first frequency, the destination circuit operating on the other of the first and second clock signals, the method comprising the steps of generating a data transfer reference signal having one pulse within a cycle of the second clock signal and synchronized with a rising edge of one of the pulses of the first clock signal; and transferring data using the data transfer reference signal.

22. The method of claim 21, wherein said transferring step determines whether or not the destination circuit has completely received data transferred from the source circuit using the data transfer reference signal.

23. The method of claim 21, wherein the data transfer reference signal generating step includes the steps of:

providing a first output signal from a first flip-flop circuit that receives a signal whose frequency is half the second frequency and operates on the second clock signal;

providing a second output signal from a second flip-flop circuit that is connected to the first flip-flop circuit in series and operates on the first clock signal; and generating the data transfer reference signal from an EXOR circuit that provides an EXOR of the first and second output signals having different phases.

24. The method of claim 21, wherein the data transfer reference signal generating step includes the steps of:

providing a first output signal from a first flip-flop circuit that receives a loop-backed signal of a NAND of a signal generated by the reference signal generator and operates on the second clock signal;

providing a second output signal from a second flip-flop circuit connected to the first flip-flop circuit in series and operates on the first clock signal; and generating the data transfer reference signal from an EXOR circuit that provides an EXOR of the first and second output signals having different phases.

25. An apparatus for transferring data between a source circuit and a destination circuit that operate independently of each other, the source circuit operating on one of a first clock signal having a first frequency and a second clock signal having a second frequency that is lower than the first frequency, the destination circuit operating on the other of the first and second clock signals, the source circuit comprising:

a reference signal generator for generating a data transfer reference signal; and a transfer circuit for transferring data using the data transfer reference signal, wherein said reference signal generator includes:
a first flip-flop circuit that operates on the second clock signal,
a second flip-flop circuit that receives a signal based on an output signal of the first flip-flop circuit and operates on the first clock signal,
an inverter that inverts output signal from the first flip-flop circuit to output an inverted signal thereto, and
an EXOR circuit that provides an EXOR of an output signal from the second flip-flop circuit and an input signal thereto, the EXOR serving as the data transfer reference signal.

26. The apparatus of claim 25, wherein said transfer circuit includes:

a multiplexer THAT outputs data from the source circuit in sync with the data transfer reference signal, and a third flip-flop circuit that is connected to the multiplexer in series and transfers data from the multiplexer to the destination circuit.

27. An apparatus for transferring data between a source circuit and a destination circuit that operate independently of each other, the source circuit operating on one of a first clock signal having a first frequency and a second clock signal having a second frequency that is lower than the first frequency, the destination circuit operating on the other of the first and second clock signals, the source circuit comprising:

a reference signal generator for generating a data transfer reference signal; and a transfer circuit for transferring data using the data transfer reference signal, wherein said reference signal generator includes:
a first flip-flop circuit that operates on the second clock signal,
a second flip-flop circuit that receives a signal based on an output signal of the first flip-flop circuit and operates on the first clock signal,
a NAND circuit that provides a NAND of an output signal of the first flip-flop circuit and a reset signal to be looped back to the first flip-flop circuit, and
an EXOR circuit that provides an EXOR of an output signal from the second flip-flop circuit and an input signal thereto, the EXOR serving as the data transfer reference signal.

28. The apparatus of claim 27, wherein said transfer circuit includes:

a multiplexer that outputs data from the source circuit in sync with the data transfer reference signal, and a third flip-flop circuit that is connected to the multiplexer in series and transfers data from the multiplexer to the destination circuit.

29. An apparatus for transferring data between a source circuit and a destination circuit that operate independently of each other, the source circuit operating on one of a first clock signal having a first frequency and a second clock signal having a second frequency that is lower than the first frequency, the destination circuit operating on the other of the first and second clock signals, the destination circuit comprising:

a reference signal generator for generating a data transfer reference signal; and a transfer circuit for receiving data using the data transfer reference signal, wherein said reference signal generator includes:
a first flip-flop circuit that operates on the second clock signal,
a second flip-flop circuit that receives a signal based on an output signal of the first flip-flop circuit and operates on the first clock signal,
a NAND circuit that provides a NAND of an output signal of the first flip-flop circuit and a reset signal to be looped back to the first flip-flop circuit, and
an EXOR circuit that provides an EXOR of an output signal from the second flip-flop circuit and an input signal thereto, the EXOR serving as the data transfer reference signal.

30. The apparatus of claim 29, wherein the transfer circuit further includes a read buffer circuit for holding data transferred from the source circuit to the destination circuit.

31. The apparatus of claim 29, wherein said transfer circuit includes:

an AND circuit that provides an AND of the data transfer reference signal and a signal transmitted from the source circuit, and a third flip-flop circuit that is connected to the AND circuit in series and fetches the transmitted signal.

32. An apparatus for transferring data between a source circuit and a destination circuit that operate independently of each other, the source circuit operating on one of a first clock signal having a first frequency and a second clock signal having a second frequency that is lower than the first frequency, the destination circuit operating on the other of the first and second clock signals, the apparatus comprising:

- a reference signal generator for generating a data transfer reference signal;
- a transfer circuit for transferring data using the data transfer reference signal; and
- data relay circuit arranged between and connected to the source and destination circuits and operating on a third clock signal of a third frequency that is higher than any one of the first and second frequencies,
- wherein said reference signal generator includes:
  - a first flip-flop circuit that operates on the second clock signal,
  - a second flip-flop circuit that receives a signal based on an output signal of the first flip-flop circuit and operates on the first clock signal,
  - an inverter that inverts output signal from the first flip-flop circuit to output an inverted signal thereto, and
  - an EXOR circuit that provides an EXOR of an output signal from the second flip-flop circuit and an input signal thereto, the EXOR serving as the data transfer reference signal.

33. The apparatus of claim 32, wherein said transfer circuit includes:

- a multiplexer outputs data from the source circuit in sync with the data transfer reference signal, and
- a third flip-flop circuit that is connected to the multiplexer in series and transfers data from the multiplexer to the destination circuit.

* * * * *